US009231846B2

(12) United States Patent
Sinha et al.

(10) Patent No.: US 9,231,846 B2
(45) Date of Patent: Jan. 5, 2016

(54) PROVIDING NETWORK CAPABILITY OVER A CONVERGED INTERCONNECT FABRIC

(75) Inventors: Suyash Sinha, Kirkland, WA (US); Alexey Pakhunov, Sammamish, WA (US); Ajith Jayamohan, Redmond, WA (US); Stephen Francis Heil, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 778 days.

(21) Appl. No.: 13/302,258

(22) Filed: Nov. 22, 2011

(65) Prior Publication Data

US 2013/0132607 A1 May 23, 2013

(51) Int. Cl.
G06F 15/173 (2006.01)
H04L 12/701 (2013.01)
H04L 29/12 (2006.01)

(52) U.S. Cl.
CPC ............ *H04L 45/00* (2013.01); *H04L 61/103* (2013.01); *H04L 61/2015* (2013.01)

(58) Field of Classification Search
CPC ................................................ H04L 29/08126
USPC ........................................................ 709/238
See application file for complete search history.

(56) References Cited

U.S. PATENT DOCUMENTS

| 5,436,902 | A | 7/1995 | McNamara et al. | |
|---|---|---|---|---|
| 6,950,394 | B1 * | 9/2005 | Chou et al. | 370/229 |
| 7,307,995 | B1 * | 12/2007 | Iyer et al. | 370/395.32 |
| 7,317,734 | B2 | 1/2008 | Joy et al. | |
| 7,433,814 | B2 | 10/2008 | Liu et al. | |
| 7,447,198 | B1 * | 11/2008 | Banks et al. | 370/386 |
| 7,555,420 | B2 | 6/2009 | Wang et al. | |
| 7,643,752 | B2 | 1/2010 | Swenson et al. | |
| 7,805,287 | B1 | 9/2010 | Jones | |
| 7,822,028 | B1 * | 10/2010 | Rimmer | 370/389 |
| 7,848,913 | B2 | 12/2010 | Salmonsen | |
| 2002/0136225 | A1 * | 9/2002 | Joy et al. | 370/401 |
| 2002/0156612 | A1 * | 10/2002 | Schulter et al. | 703/23 |

(Continued)

FOREIGN PATENT DOCUMENTS

| CN | 1520550 A | 8/2004 |
|---|---|---|
| CN | 1968253 A | 5/2007 |

(Continued)

OTHER PUBLICATIONS

Addagatla, et. al, "Direct Network Prototype Leveraging Light Peak Technology", In Proceedings of the 18th IEEE Symposium on High Performance Interconnects, Aug. 18-20, 2010, pp. 109-112.

(Continued)

*Primary Examiner* — Guang Li
(74) *Attorney, Agent, or Firm* — Alin Corie; Judy Yee; Micky Minhas

(57) ABSTRACT

A subject disclosure is directed towards emulating a data network interface for operating an interconnect controller in accordance with a networking standard. The emulated data network interface provides address resolution data associated with a destination, within a converged interconnect fabric, for application data. The address resolution data identifies a communication path that is compatible with the interconnect controller. The application data conforms to the networking standard. The emulated data network interface instructs the interconnect controller to route the application data to the destination via the compatible communication path.

20 Claims, 8 Drawing Sheets

(56) References Cited

U.S. PATENT DOCUMENTS

| | | | |
|---|---|---|---|
| 2002/0156613 A1* | 10/2002 | Geng et al. ................. 703/23 |
| 2002/0191616 A1* | 12/2002 | Sarmiento et al. ............ 370/400 |
| 2008/0044181 A1* | 2/2008 | Sindhu ................ H04J 14/0227 |
| | | | 398/49 |
| 2009/0296590 A1* | 12/2009 | Joyner .......................... 370/250 |
| 2009/0324243 A1* | 12/2009 | Neilson ............. H04Q 11/0005 |
| | | | 398/154 |
| 2010/0312913 A1* | 12/2010 | Wittenschlaeger ........... 709/238 |

FOREIGN PATENT DOCUMENTS

| | | |
|---|---|---|
| CN | 101986666 A | 3/2011 |
| WO | 02086712 A1 | 10/2002 |

OTHER PUBLICATIONS

Ricker, Thomas, "How Sony Accidentally did the Right thing with Light Peak", Jul. 7, 2011, Available at: http://thisismynext.com/2011/07/07/sony-light-peak-apple-thunderbolt-intel/, 5 pages.

Zheng, et al., "EMPOWER: A Network Emulator for Wireline and Wireless Networks", In Proceedings of the IEEE INFOCOM, vol. 3, Mar. 30-Apr. 3, 2003, pp. 1933-1942.

"European Search Report for EP Application No. 12193333.7", Mailed Date Apr. 5, 2013, 4 pages.

Apple Inc, "Thunderbolt Device Driver Programming Guide", Retrieved from Internet at URL:http://developer.apple.com/library/mac/documentation/HardwareDrivers/Conceptual/ThunderboltDevGuide/ThunderboltDevGuide.pdf, Dec. 21, 2011, pp. 1-21.

"Examination Report Received for European Patent Application No. 12193333.7", Mailed Date: Mar. 13, 2014, 4 Pages.

"First Office Action and Search Report Issued in Chinese Patent Application No. 201210480123.0", Mailed Date: Dec. 9, 2014, 14 Pages.

"Second Office Action and Search Report Issued for Chinese Patent Application No. 201210480123.0", Mailed Date: Jun. 19, 2015, 15 Pages.

* cited by examiner

PROVIDING NETWORK CAPABILITY OVER A CONVERGED INTERCONNECT FABRIC

BACKGROUND

Various implementations of interconnect technologies (e.g., an optical/electrical interconnect technology) provide an interface that enables data communication between a computer and peripheral devices. The interconnect technologies may also enable the communication of data between computing devices (i.e., nodes) via cables/connectors. Optical data communication, for example, is in general any form of telecommunication that uses light as a transmission medium. Light in general requires less energy than copper cables and produce less heat than electrical telecommunication.

INTEL® Thunderbolt™ (which may be also known as Light Peak™) and SEAMICRO® SM10000™ represent types of a converged interconnect fabric technology that is connection-oriented and/or bus protocol independent and may use electrical or optical cables. INTEL® Thunderbolt™ is an interoperable standard that can deliver a bandwidth that exceeds Universal Serial Bus (USB) and Serial ATA and replace the multitudinous connector types (e.g., USB, FireWire, DVI, HDMI, DisplayPort) with a single connector. INTEL® Thunderbolt™ chips interconnect two or more computing devices/peripheral devices and transmit and receive information for both PCI Express™ (PCIe) and DisplayPort™ protocols. The INTEL® Thunderbolt™ chip switches between the two protocols to support communications over a single electrical or optical cable. Because certain interconnect technologies, such as INTEL® Thunderbolt™, have not been accepted by a significant number of computer/peripheral device manufacturers that rely on USB or application software developers that rely on existing networking standards, an average consumer may have to wait several years before taking advantage of such a technology.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards enabling a local area network over a converged interconnect fabric by emulating a data network interface that is interoperable with the converged interconnect fabric. In one aspect, the converged interconnect fabric includes a plurality of optical interconnects that employ nanostructure reflectors and/or a plurality of electrical interconnects. The data network interface may include a software implementation of a networking standard that controls networking hardware components, such as a switch, which comply with the converged interconnect fabric. The network hardware components may also include an interconnect controller and a bus protocol device. In one aspect, the data network interface may provide address resolution data associated with a destination, within the converged interconnect fabric, for application data. The data network interface uses the interconnect controller to route the application data to the destination based on the address resolution data.

In another aspect, the software implementation of the networking standard may include a kernel mode component and a user mode component that cooperate to provide an intermediate driver that implements an data communication protocol for a native miniport driver associated with the networking hardware components. In another aspect, the intermediate driver also provides a miniport to overlaying protocol drivers in a protocol stack. For example, the overlaying protocol drivers may attempt to request host configuration data using a Dynamic Host Configuration Protocol (DHCP) message. The intermediate driver redirects the message to a root node within the converged interconnect fabric, which replies with a network address associated with the data network interface.

In one aspect, the kernel mode component may intercept requests for the address resolution data associated with the destination with the user mode component redirecting the requests to a root node via the interconnect controller. In one aspect, an orchestrator running on the root node responds with a mapping between a network address and a physical address associated with a data network interface of the destination. The kernel mode component may store a communication path to the destination that is represented as one or more topology identifiers and the destination physical address. The kernel mode component may instruct the interconnect controller to communicate the application data to the destination via the communication path along the converged interconnect fabric (e.g., an optical or electric communication path).

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards providing a communication network in accordance with a networking standard. In one example implementation, the communication network may be a local area (Ethernet) network over a converged interconnect fabric. A native networking standard for the local area network may be the same networking standard associated with the converged interconnect fabric or may be a completely different networking standard. Each node of the communication network may include one or more emulated data network interfaces that are interoperable with an interconnect controller for communicating application data, which conforms to the native networking standard, through the converged interconnect fabric. An example emulated data network interface may provide an Ethernet network capability over non-Ethernet networking components (e.g., optical interconnects).

In one example implementation, each emulated data network interface may comprise an abstraction of a data communication protocol that conforms to the native networking standard and one or more networking hardware components, such as a switch for coupling with one or more electrical or optical interconnects and/or an optical or electrical interconnect controller for the converged interconnect fabric. It is appreciated that the term "data network interface" may be used interchangeably with other terms having similar or equivalent meanings, such as network interface controller, network adapter and/or the like. Any of these terms may be used throughout the present specification.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, networking and electrical/optical communications in general.

Figure 1:
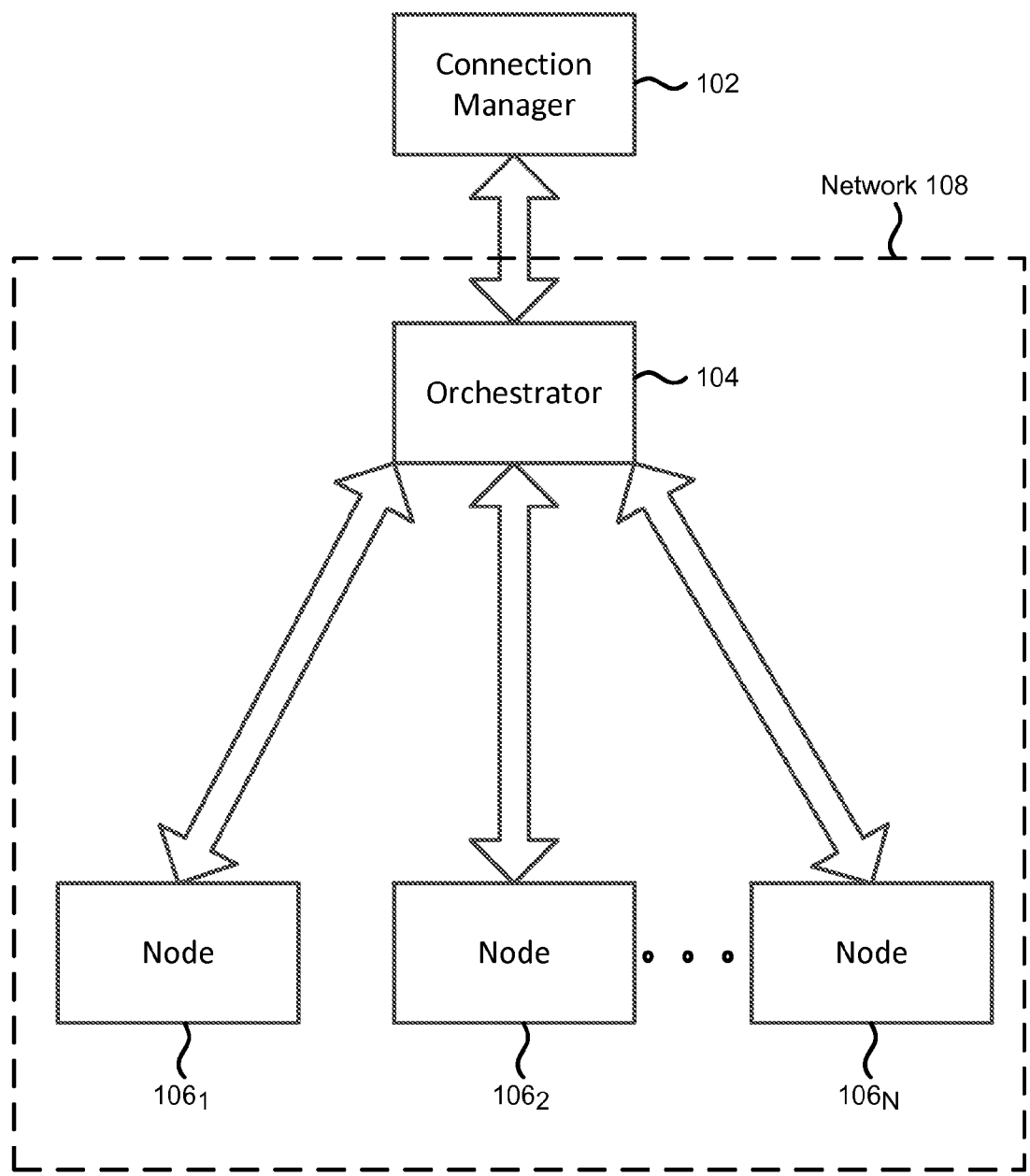
FIG. 1 is a block diagram illustrating an example architecture of a communication network according to one example implementation.

FIG. 1 is a block diagram illustrating an example architecture of a communication network according to one example implementation. The example architecture comprises various components including a connection manager 102, an orchestrator 104 and a plurality of nodes 106, which are illustrated in FIG. 1 as "Node 106$_1$ ... Node 106$_N$." Each of the plurality of nodes 106 may be a type of a computing device.

The plurality of nodes 106 may form at least a portion of a network 108, which may be a type of communication network, such as a local area network over a converged interconnect fabric. The converged interconnect fabric may integrate all communication (e.g., inter-process/cluster communications, network traffic, storage input/output and/or the like) into a single fabric of common interconnects over which a consolidated set of computing, storage and networking capabilities may be provided. According to one example implementation, the converged interconnect fabric may be deployed in a data center environment to enhance communications for a collection of blade servers. The network 108 may communicate data between the plurality of nodes 106 and/or with external computing devices, such as nodes of another network, via a connection-oriented interconnect technology (e.g., INTEL® Thunderbolt™ (which may be also known as Light Peak™) and/or the like).

The interconnect technology may be protocol-independent and, hence, may be compatible with any type of serial or parallel bus protocol (e.g., Universal Serial Bus (USB), PCI Express™ (PCIe), DisplayPort™) and/or the like). The interconnect technology may utilize hardware/software implementations of these protocols to perform data input/output operations. Alternatively, the interconnect technology may incorporate a proprietary bus protocol for point-to-point data communications. In one example implementation, the network 108 may include an electrical or optical communication network between two or more of the plurality of nodes 106, which generally refers to any form of a telecommunication network that uses copper or light, respectively, as a transmission medium.

Each of the plurality of nodes 106 may be logically connected to the orchestrator 104, which enables a data network (e.g., TCP/IP over Ethernet) over the interconnect technology as described herein. The orchestrator 104 may include software code that is executed on another node as a software module, which may be referred to as a root node, within the network 108. The connection manager 102 may also communicate with the orchestrator 104 via a logical connection. The connection manager 102 may also be a software module that runs on the root node or may run on a computing device that is located outside of the network and configured to manage the plurality of nodes 106.

As described herein, the connection manager 102 controls various interconnect technology mechanisms (e.g., firmware, drivers, hardware controllers, switches and/or the like) for discovering a bus topology and establishing (logical) communication paths within the network 108. In conjunction with these mechanisms, the connection manager 102 enumerates each data network interface and builds a topology graph in which a topology identifier (e.g., TopologyID), which may be a unique identifier within the network 108, is assigned to each data network interface within each of the nodes 106 according to one example implementation. Hence, an example node 106$_1$ comprising multiple data network interfaces may have multiple topology identifiers. Each identifier may be valid for a limited time period, such as the duration between topology enumerations. The connection manager 102 may be notified of topology changes resulting from certain events (e.g., plug/unplug events, power on/power off nodes and/or the like) and modify the topology identifier assignment within the network 108 in response.

During an initial enumeration, the connection manager 102 configures the (logical) communication paths between the plurality of nodes 106. After the initial enumeration, the connection manager 102 may reconfigure the communication paths between the plurality of nodes 106 based on specific network traffic patterns. The connection manager 102 may assign an identifier to each communication path that is accessible from a particular node. Hence, the particular node corresponds with a set of local communication path identifiers in which each path identifier represents a number of data network interfaces between a source and a destination data network interface, inclusively. With respect to implementations comprising multiple communication networks that may be interconnected arbitrarily, multiple connection managers 102 in adjacent networks utilize primitives to configure inter-network communication paths.

In one example implementation, the network 108 may be a local area network over a plurality of electrical or optical interconnects between various pairs of the plurality of nodes 106. Each interconnect may include an optical or electrical cable connecting two data network interfaces (adapters) at each port (e.g., mini port). The cable may be manufactured using one or more electrical conductors or optical fibers. The data network interface port may be configured to form a coupling with a cable connector such that the optical cable is communicably connected to a converged interconnect fabric technology hardware component, such as a switch (e.g., a non-blocking switch).

An example data network interface may include a software implementation of a data communication protocol (e.g., a data link layer protocol, such as a media access control sublayer protocol) in accordance with a particular networking standard (e.g., Ethernet). According to such an implementation, for higher level protocols, the data communication protocol emulates functionality that conforms to the particular networking standard and enables interoperability with the converged interconnect fabric technology. The example data network interface may also include a hardware implementation (e.g., a Network Interface Card (NIC)) of the converged interconnect fabric technology and/or the bus protocol.

In one example implementation, the data network interfaces use physical addresses (e.g., data link layer address in a protocol stack, topology identifiers in an optical or electrical communication network and/or the like) and path identifiers to route data along a corresponding communication path that may include one or more interconnects. For example, the corresponding communication path (e.g., data link layer communication path) may include two or more interconnects that define a chain through which one data network interface communicates with the destination data network interface via one or more intermediary data network interfaces (e.g., hops). When routing data along such a communication path, each interconnect transports the data to an intermediary data network interface, which relays the data to a next intermediary data network interface or ultimately the destination data network interface.

In addition to the communication path configuration, the connection manager 102 may assign Internet Protocol (IP) addresses to the plurality of nodes 106. For example, the connection manager 102 may implement a dynamic host configuration protocol (DHCP) server. Because the data network interfaces initially lack a globally unique identifier, the connection manager 102 determines the IP addresses based on a globally unique identifier for each of the nodes 106 (e.g., host name) and the locally unique identifier for each data network interface.

Figure 2:
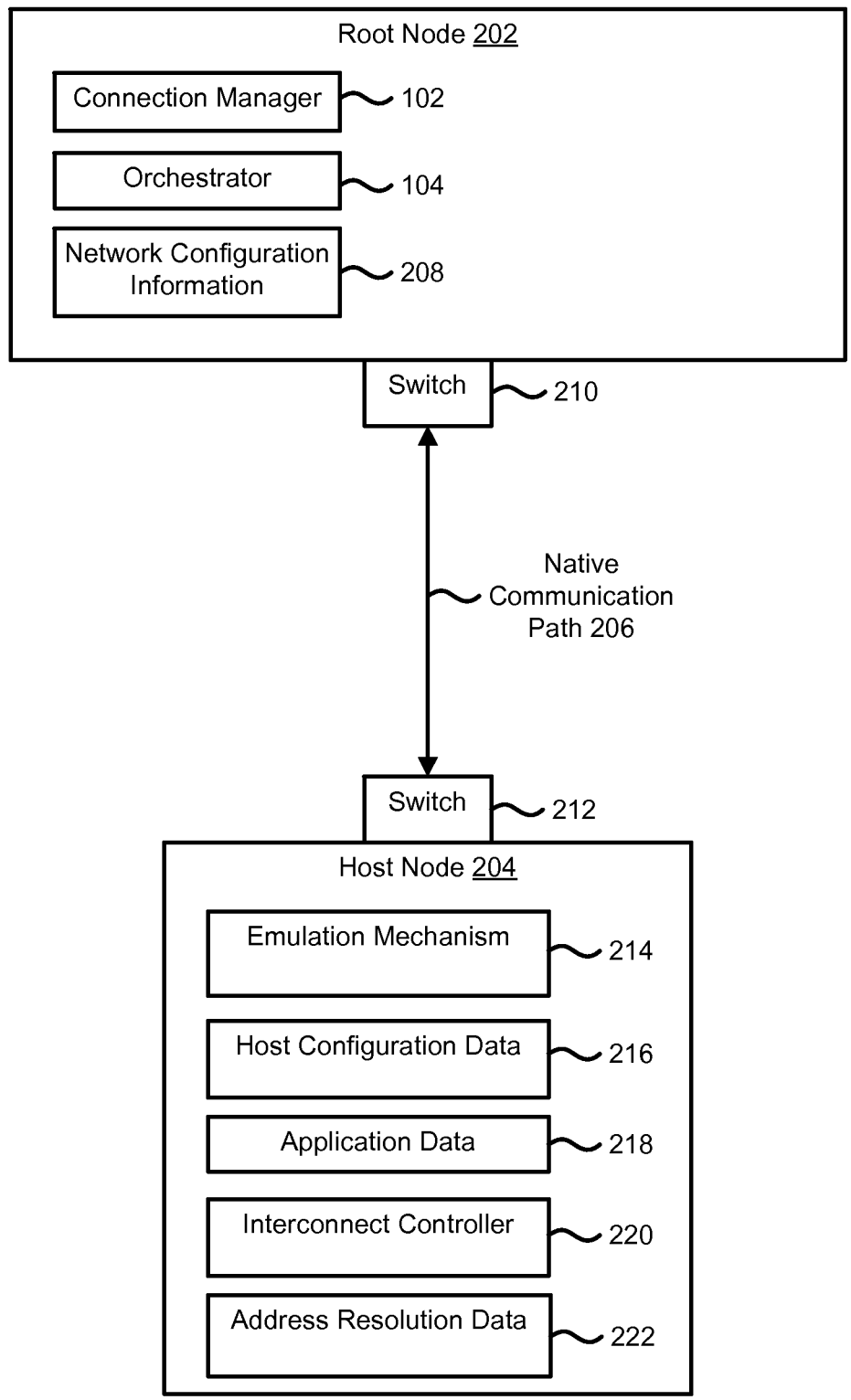
FIG. 2 is a block diagram illustrating an example system for emulating a data network interface to enable interoperability with an interconnect controller according to one example implementation.

FIG. 2 is a block diagram illustrating an example system for emulating a data network interface that enables interoperability with a interconnect controller according to one example implementation. The example system includes various components, such as a root node 202 and a host node 204, connected to each other through a native communication path 206 associated with a interconnect technology. Along with other nodes, the root node 202 and the host node 204 may form a portion of a communication network, such as a local area network over a converged interconnect fabric.

In one example implementation, the root node 202 includes various example components, such as the connection manager 102, the orchestrator 104 and network configuration information 208. The root node 202 may also include one or more interconnect technology-compliant networking components, such as a switch 210, through which data is communicated to the host node 204 along the native communication path 206. In conformity with the interconnect technology, the connection manager 102 may provision the native communication path 206 between the switch 210 and a complementary switch on the host node 204, such as a switch 212. In one example implementation, the native communication path 206 may be represented by one or more topology identifiers that correspond to one or more interconnects that couple the switch 210 and the switch 212.

Initially, the connection manager 102 may pre-configure the root node 202 with one or more addresses that enable a computing device, such as the host node 204, to locate and communicate with the root node 202. The connection manager 102 and/or the orchestrator 104 may provide the one or more addresses to the host node 204 as well as other host nodes within the communication network. The one or more addresses may correspond with layers of a protocol stack (e.g., Open Systems Interconnection (OSI) Reference networking model), such as a data link layer and a network layer. For example, the root node 202 may be pre-configured with a physical address and a network address that are associated with the data link layer protocol and the network layer protocol, respectively.

As described herein, the connection manager 102 and the orchestrator 104 may produce the network configuration information 208 as a description of an underlying network topology. In one example implementation, the network configuration information 208 may include a mapping between a locally unique identifier and one or more addresses for each switch in the communication network. For example, the connection manager 102 and the orchestrator 104 may assign a network topology identifier (e.g., a TopologyID) and a physical or hardware address (e.g., a MAC address), respectively, to the switch 212 in combination with an assignment of a network address (e.g., an IP address), which are stored in the network configuration information 208 and communicated in whole or in part to the host node 204 and other host nodes.

When another host node desires to communicate data to the host node 204, some of these addresses may be used to identify and locate the host node 204 within the communication network. In one example implementation, the network configuration information 208 may map a physical address of the host node 204 and/or a physical address of a source host node to a unique path identifier (e.g., a HopID) that refers to a logical connection from the source host node to the (destination) host node 204. As described herein, the unique path identifier may represent a communication path that is compatible or native to the interconnect controller 220. Based on the unique path identifier, the interconnect controller 220 identifies an appropriate switch port to communicate the application data 218, such as an Ethernet frame, to ensure delivery at the host node 204. The application data 218 may reach an intermediary host node that routes such data to a next node along the compatible communication path.

The host node 204 includes various example components, such as an emulation mechanism 214, host configuration data 216, application data 218, an interconnect controller 220 and address resolution data 222. In one example implementation, the emulation mechanism 214 may implement a data communication protocol (driver) in accordance with a networking standard (e.g., Ethernet) and interoperable with the interconnect controller 220. The emulation mechanism 214 may provide higher layer protocols with various data network interface services that behave in conformity with the networking standard. To perform these services, the emulation mechanism 214 may call device driver functions associated with the interconnect controller 220 in order to communicate the application data 218 to a destination (node). For example, the emulation mechanism 214 may transform TCP/IP data sequences (e.g., packets) into Ethernet-formatted frames that are capable of being transmitted on a communication path by the interconnect controller 220.

The emulation mechanism 214 may store a physical address and a network address associated with the host node 204 in the host configuration data 216. The emulation mechanism 214 may also store a physical address and a network address associated with other host nodes including the root node 202 in the address resolution data 222. In one example implementation, the emulation mechanism 214 may also store a set of (path) identifiers for one or more accessible communication paths between the host node 204 and the other host nodes. Each identifier may be translated by the interconnect controller 220 into a set of interconnects that define a compatible communication path to the destination. Optionally, the address resolution data 222 may also include a topology identifier (e.g., a TopologyID) for each intermediary switch between the host node 202 and the destination as well as the destination itself.

The emulation mechanism 214 may include various example components, such as a kernel mode (driver) component and a user mode (service) component, which execute the data communication protocol operations. In one example implementation, the kernel mode component and the user mode component may coordinate requests for the host configuration data 216 (e.g., Dynamic Host Configuration Protocol (DHCP) requests) to the root node 202. In another example implementation, the kernel mode component and the user mode component may coordinate requests for the address resolution data 222 (e.g., Address Resolution Protocol (ARP) requests) to the root node 202.

In one example implementation, the emulation mechanism 214 and the orchestrator 104 may coordinate multicasting and/or broadcasting services on top of a connection-oriented interconnect technology. For example, when the emulation mechanism 214 receives a request for the address resolution data 222 associated with a destination class D IP address for a multicast packet, the emulation mechanism 214 may communicate the request to the orchestrator 104. The orchestrator 104 responds with a MAC address associated with the switch 210 and a HopID path identifier associated with the native communication path 206. As a result, the address resolution data 222 includes the MAC address and the HopID path identifier as the appropriate destination physical address and appropriate logical connection, respectively, for the multicast packet and/or the broadcast packet.

Upon receiving the multicast packet, the orchestrator 104 references a multicast group membership table within the network configuration information 208, identifies one or more member nodes associated with the destination class D IP address and generates a list comprising each member IP address. The orchestrator 104 determines whether any member node is outside of a subnet based on past participations with the corresponding multicast group. If there are any such nodes, the orchestrator 104 adds each associated gateway mechanism IP address to the list. For each IP address in the list, the orchestrator 104 creates a copy of the multicast packet and communicates the copy to the corresponding member node. According to one example implementation, the orchestrator 104 may resolve each IP address to a physical address and a communication path identifier for the corresponding member node.

With respect to implementations associated with receiving the broadcast packet, the orchestrator 104 identifies each host node with a same subnet as the host node 204 and creates a list comprising each IP address of other host nodes within the subnet. The orchestrator 104 excludes any host node outside of the subnet from such a list. The orchestrator 104 creates a copy of the broadcast pack and communicates the copy to each host node. In one example implementation, the orchestrator 104 may resolve each IP address to a physical address and a path identifier associated with another subnet host node.

The interconnect controller 220 is in general a building block for creating interconnect technology networking components, such as the switch 210 and the switch 212. In one example implementation, these switches may be high-performance, unblocking crossbar (bus) protocol switches. The interconnect controller 220 may be a chip that provides protocol-switching capabilities such that multiple protocols (e.g., DisplayPort and PCI Express) may be run over a single cable (e.g., an electrical or optical cable). In addition to one or more ports for a switch, the interconnect controller 220 includes one or more bus protocol adapter ports. External interfaces of the interconnect controller 220 may provide functionality to a specific application.

Figure 3:
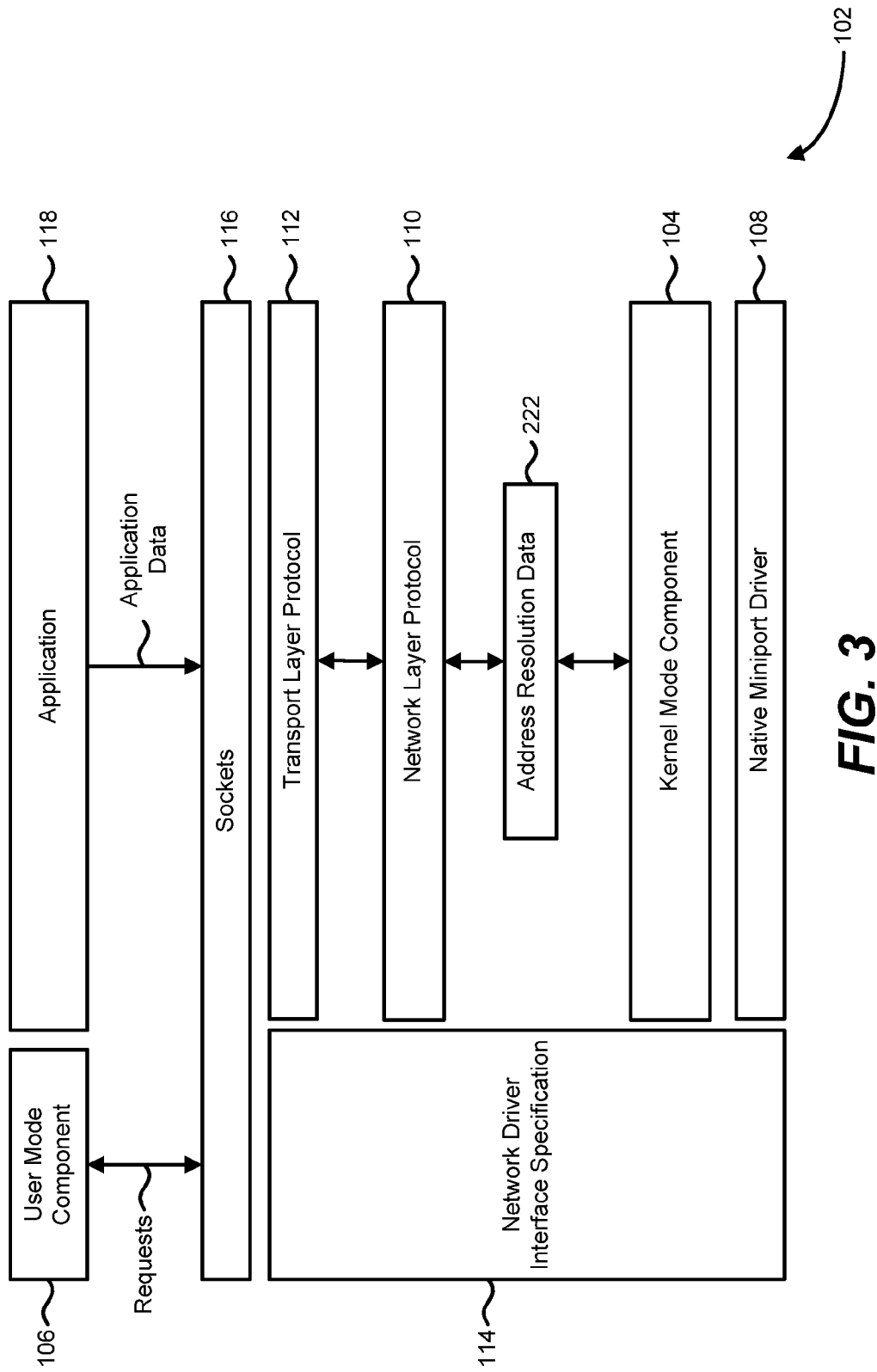
FIG. 3 is a block diagram illustrating an example protocol stack that is interoperable with a communication network according to one example implementation.

FIG. 3 is a block diagram illustrating an example protocol stack that is interoperable with a communication network according to one example implementation. Each layer of the example stack, such as a protocol stack 302, may be associated with a well-known networking model. In one example implementation, the protocol stack 302 may include a kernel mode component 304 and a user mode component 306 of the emulation mechanism 214 as illustrated in FIG. 2.

In one example implementation, the kernel mode component 304 may function as a data link layer protocol configured to perform various services, which may include transferring data between nodes in a network (i.e., a communication network), such as a local area network over a converged interconnect fabric. For example, the kernel mode component 304 may utilize a native miniport driver 308 associated with a interconnect technology device, which includes various networking hardware components, such as a switch, one or more transceivers, one or more bus protocol modules and/or the like. The various networking hardware components may implement a physical layer within the protocol stack 302, which manages reception and transmission of an unstructured raw bit stream over a physical medium (e.g., electrical conductors or optical fibers) to which the interconnect technology device is attached.

In one example implementation, the kernel mode component 304 may abstract vendor-specific functionality that is provided by the native miniport driver 308 for the various networking hardware components. Such an abstraction may ensure that the kernel mode component 304 may be able to emulate a data network interface using networking hardware components from different hardware vendors. In addition, the kernel mode component 304 may abstract the hardware vendor-specific functionality from a connection manager, such as the connection manager 102 of FIG. 1. The kernel mode component 304 may also use the native miniport driver 308 to control the various hardware components for the purpose of communicating application data to a destination (node).

In addition to transferring the application data, the kernel mode component 304 may provide host configuration services and/or address resolution services. The user mode component 306 may support these services by communicating host configuration requests and/or address resolution requests to an orchestrator running on a root node (e.g., the root node 202 of FIG. 2). For example, the kernel mode component 304 may intercept such requests from upper layer protocol drivers, such as a network layer protocol 310 and a transport layer protocol 312, and may redirect the requests to the user mode component 306, which modifies the requests in order to be communicated to the root node. Address information provided by the root node in response to these requests may be stored in the host configuration data 216 and/or the address resolution data 222.

In one example implementation, the kernel mode component 304 intercepts an Address Resolution Protocol (ARP) request associated with the destination and redirects the request to the user mode component 306, which inserts a network address and a physical address associated with the root node into destination address fields. The purpose of the ARP request may be to determine a physical address (e.g., a data link layer protocol address, such as a MAC address) of the destination that maps to a known network address (e.g., a network layer protocol address, such as an IP address). When the root node responds with the physical address, the user mode component 306 stores the physical address associated with the destination in the address resolution data 222 and the kernel mode component 304 proceeds to route the application data. If another set of application data is to be communicated to the destination in the future, the network layer protocol 310 may reference the address resolution data 222 in order to resolve the known network address to the appropriate physical address. In such an implementation, the address resolution data 222 functions as a cache for known physical addresses of other host nodes.

In another example implementation, the kernel mode component 304 intercepts a Dynamic Host Configuration Protocol (DHCP) request and redirects the request to the user mode component 306, which inserts a network address and a physical address associated with the root node 202 into the destination address fields. The purpose of the DHCP request is to ascertain an appropriate and unique network address for the host node 302. When the root node 202 responds with the network address, the user mode component 306 stores the network address associated with the host node 204 in the host configuration data 216.

The DHCP is in general a network configuration protocol for host nodes on a local area network, such as an Internet Protocol (IP) network. In order to communicate with other host nodes, a source host node is to be configured with a unique network address. The host node may also be configured with a physical address. The root node implements the DHCP and provides a central database of network configuration information to prevent duplicate network address assignments. The root node may also provide addition network configuration information, such as a network topology identifier. Alternatively, an external server residing outside of the local area network implements the DHCP and assigns the network addresses (i.e., IP addresses) to the host nodes. Such a server maps the network address to physical addresses (i.e., MAC addresses) that may be assigned by the root node or assigned statically. Furthermore, a gateway mechanism for the local area network may function as a DHCP proxy and relay DHCP requests up to the external server.

In yet another example implementation, the kernel mode component 304 may perform multicasting and/or broadcasting services on top of a connection-oriented interconnect technology. For example, when the kernel mode component 304 receives a request (e.g., an ARP request) to resolve a class D IP address, which includes any IP address having a first byte value that ranges from 224 to 247, the kernel mode component 304 may redirect the request to the user mode component 306, which queries the orchestrator running on the root node. The class D IP address may refer to a destination of a multicast packet. Instead of responding with a specific MAC address for the class D IP address, the orchestrator provides a MAC address associated with a switch attached to the root node. As a result, the network layer protocol 310 resolves the class D IP address to the orchestrator MAC address and the kernel mode component 304 communicates the multicast packet to the orchestrator.

Upon receiving the multicast packet, the orchestrator references a multicast group membership table to identify one or more member nodes of the corresponding multicast group and generates a list comprising each member IP address. The orchestrator determines whether any member node is outside of a subnet based on past participations with the corresponding multicast group. If there are any such nodes, the orchestrator adds each associated gateway mechanism IP address to the list. For each IP address in the list, the orchestrator creates a copy of the multicast packet and communicates the copy to the IP address. With respect to a broadcast packet, the orchestrator creates another list comprising each IP address of the host nodes within the subnet and communicates a copy of the broadcast packet to each host node.

In one example implementation, the native miniport driver 308 (e.g., a Media Access Controller (MAC) device driver) wraps a hardware implementation of various portions of the data link layer and/or the physical layer of the protocol stack 302 such that the interconnect technology devices may be accessed using a common API, such as the Network Driver Interface Specification (NDIS) 314. The NDIS 314 may in general define a standard application programming interface (API) for networking devices (e.g., Network Interface Cards (NICs)). The NDIS 314 provides services to simplify development and maintenance of the native miniport driver 308 and protocol drivers for upper layers of the protocol stack 302. Furthermore, the native miniport driver 308, the kernel mode component 304 and the network protocol layer 310 may be bound together through the NDIS 314.

The network layer protocol 310 may be configured to perform application data packet delivery, which may include routing data packets through intermediate nodes, whereas the data link layer protocol performs media access control, physical addressing, flow control and/or error checking. The network layer protocol 310 may implement various methods of transferring variable length data sequences via the network to the destination. The network layer protocol 310, for instance, may include a group of internetworking methods in the Internet Protocol Suite, which may be known as TCP/IP, for transporting data packets network boundaries, if necessary, to the destination specified by a network address (e.g., an IP address as defined by an Internet Protocol (IP)). The transport layer protocol 312 may provide end-to-end communication services for sockets 316 and an application 318 within a layered architecture of the protocol stack 302. The transport layer protocol 312 provides various services, such as connection-oriented data stream support, reliability, flow control, and multiplexing.

In one example implementation, the kernel mode component 304 may be a NDIS intermediate driver (e.g., a NDIS filter intermediate driver) that is layered on top of the native miniport driver 308 (e.g., a third party interconnect technology miniport driver). The kernel mode component 304 and the user mode component 306 may emulate an Ethernet Network Interface Controller (NIC), which provides overlaying protocol drivers with a data network interface for connecting a host node to an Ethernet network. The Ethernet in general refers to a networking standard (e.g., Institute of Electrical and Electronic Engineers (IEEE) 802.3) for Local Area Networks (LAN), which may be used for connecting close-proximity computing devices together in order to share resources. In one example implementation, the kernel mode component 304 may expose an Ethernet miniport (e.g., NDISMedium IEEE 802.3 networking standard miniport) to the overlaying protocol drivers in the protocol stack 302, which may use the Ethernet miniport to communicate Ethernet frames to the destination node. To the native miniport driver 308, the kernel mode component 304 may also expose the data communication protocol for consuming the Ethernet frames.

Because the NDIS intermediate driver operates in between one or more overlying protocol drivers and the native miniport driver 308, the kernel mode component 304 may communicate with both the overlying protocol drivers and the native miniport driver 308 in order to expose protocol entry points and miniport driver entry points, respectively. The NDIS 314 calls functions at the protocol entry points on the kernel mode component 304 to communicate requests from the native miniport driver 308. The NDIS 314 calls miniport functions at the miniport driver entry points on the kernel mode component 304 to communicate the requests of one or more overlaying protocol drivers. As a result, the kernel mode component 304 may be presented as a protocol driver to the native miniport driver 308 and as a miniport driver to the overlying protocol drivers.

In one example implementation, the kernel mode component 302 exposes one virtual miniport for each underlying miniport driver that may be bound to the kernel mode component 302, such as the native miniport driver 308. The kernel mode component 304 exports one or more virtual miniports (i.e., adapters) to which the overlaying protocol drivers may bind. To each overlaying protocol driver, the virtual miniport appears to be a physical data network interface that controls the networking hardware components of the interconnect technology device.

When the virtual miniport receives data packets, the kernel mode component 304 forwards the data packets down to the native miniport driver 308 as Ethernet frames. The kernel mode component 304 may also include a NDIS filter intermediate driver or a NDIS filter driver that modifies the data packets before sending them to the native miniport driver 308. For example, the kernel mode component 304 may encrypt and compress the payloads within the data packets. NDIS filter drivers in general may monitor and modify the interaction between the overlying protocol drivers and the native miniport driver 308.

The kernel mode component 304 may expose an MTU (Maximum Transmission Unit) size, such as four thousand ninety-six (4096 or 4K bytes), which may be a largest possible (Ethernet) payload frame size that may be fragmented (at a source host node) and reassembled (at a destination host node) by an interconnect controller. The interconnect technology medium may support a maximum of 256 byte payload sizes, but may perform fragmentation and reassembly such that the upper layers of the protocol stack 302 may essentially operate at the 4 KB payload size. Alternatively, the kernel model component 304 may expose 256 bytes as the MTU size and let the protocol stack 302 perform the fragmentation and reassembly of the frames (e.g., Ethernet frames).

Figure 4:
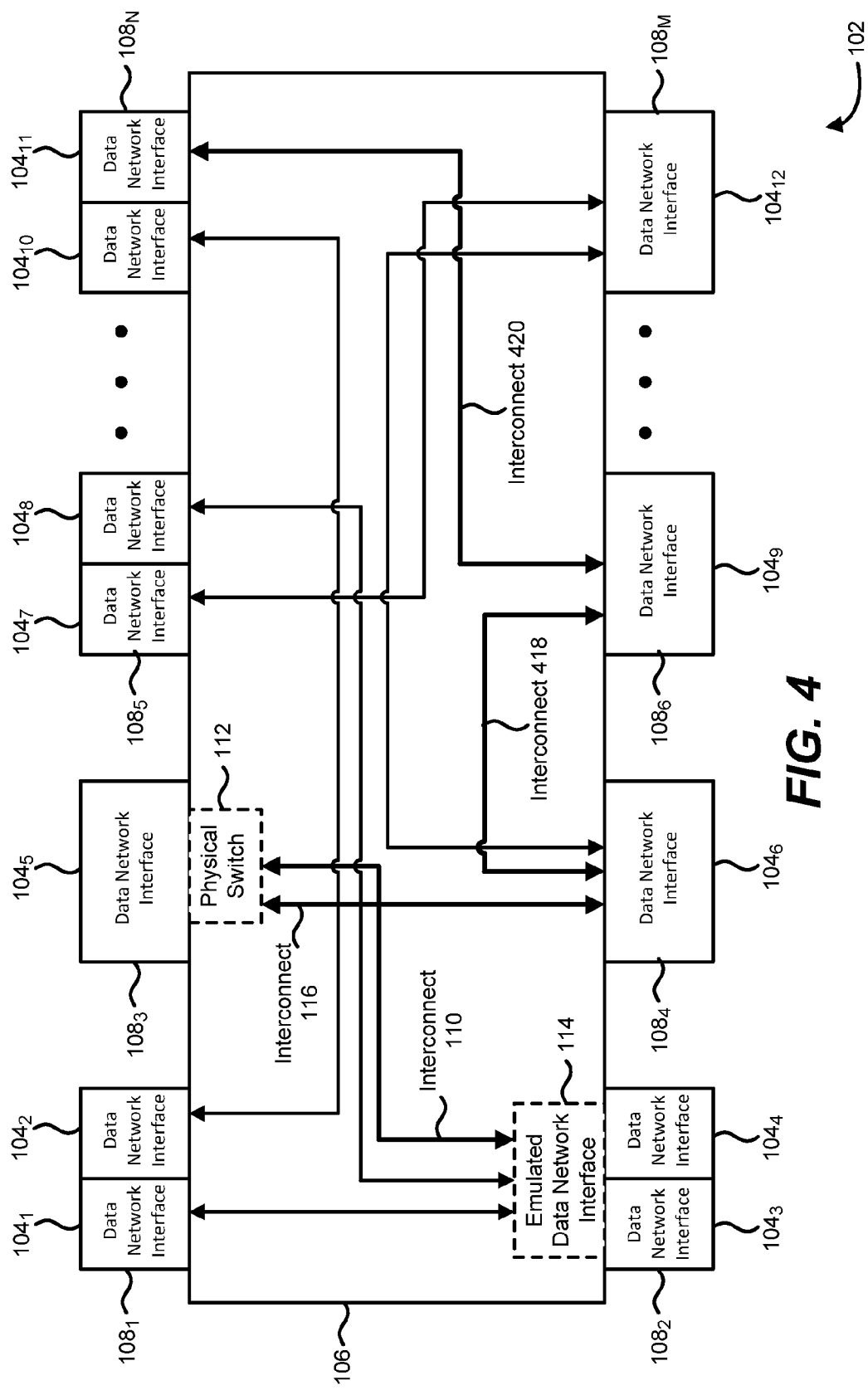
FIG. 4 is a block diagram illustrating an example configuration of a network over a converged interconnect fabric between data network interfaces according to one example implementation.

FIG. 4 is a block diagram illustrating an example configuration of a local area network over a converged interconnect fabric between data network interfaces according to one example implementation. The example configuration of the local area network, such as a local area network 402, includes a plurality of data network interfaces 404 that communicate with each other through a converged interconnect fabric 406. Each node of a plurality of nodes 408 may implement one or more of the data network interfaces 404. In one example implementation, each of the data network interfaces 404 may include software and hardware components implementing a data communication protocol that conforms to a networking standard (e.g., Ethernet) and interoperates with an interconnect technology (e.g., INTEL® Thunderbolt™ or Light Peak™).

In one example implementation, the local area network 402 may be a communication network in which one of the plurality of nodes 408 may be a root node comprising the connection manager 102 and the orchestrator 104. For instance, the plurality of nodes 408 may include computing devices (e.g., servers) that are arranged into a rack mounted computing system for which the orchestrator 104 maintains a consistent set of network configuration information. In one implementation, the converged interconnect fabric 406 may be configured to integrate computing, storage and networking services for linked nodes within a data center environment, such as the rack mounted computing system.

In one example implementation, each interconnect within the converged interconnect fabric 406 may include a cable connecting a pair of the plurality of data network interfaces 404, such as the data network interface $404_5$ and the data network interface $404_6$. The cable may be manufactured using one or more electrical conductors or optical fibers. Ports associated with the plurality of data network interfaces 404 may be configured to form couplings with cable connectors such that the cable may be communicably connected to a networking hardware component, such as a non-blocking switch.

An example interconnect 410 may couple to a physical switch 412 to which a native miniport driver (e.g., the native miniport driver 308 of FIG. 3) controls access. The emulation mechanism 214 may function as a data communication protocol (driver) to the native miniport driver. As described herein, a combination of the physical switch 412, the native miniport driver and the kernel mode component 304 of the emulation mechanism 214 may be abstracted to present the data network interface $404_5$ as a first emulated data network interface or network interface controller (NIC) to overlaying protocol drivers of a protocol stack. For example, the kernel mode component 304 may present the data network interface $404_5$ as a hardware driver/object, such as a (virtual) miniport.

Within the node $408_2$, the data network interface $404_3$ and/or the data network interface $404_4$ may be virtual data network interfaces according to another example implementation. Similar to the data network interface $404_5$, an emulated data network interface 414 may be implemented using a physical switch and the kernel mode component 304 and by abstracting hardware vendor-specific functionality that is provided by the native miniport driver. Such an abstraction may ensure that the emulated data network interface 414 is interoperable with networking hardware components from different interconnect technology hardware vendors. Alternatively, the emulation mechanism 214 may abstract the hardware vendor-specific functionality from a connection manager, such as the connection manager 102 of FIG. 1.

A virtualization manager (e.g., Microsoft® Hyper-V) running within the node $408_2$ may unbind the host operating system's protocol stack (e.g., TCP/IP stack) from the physical switch and bind the protocol stack to a virtual switch, the native miniport driver and the kernel mode component 304 of the emulated data network interface 414. The virtual switch may be used to regulate data communications with respect to the data network interface $404_3$ and/or the data network interface $404_4$.

The virtualization manager may partition the physical switch and provision data network interface $404_3$ and/or the data network interface $404_4$ as virtual data network interfaces (e.g., virtual NICs) of which each may include a virtual version of the native miniport driver and emulation mechanism 214. The data network interface $404_4$, for instance, may provide a virtual machine with a virtual protocol stack, which includes an Ethernet-compliant data communication protocol that is interoperable with a virtual version of the native miniport driver. The virtual machine may request a host configuration from the orchestrator 104, which assign a network address and/or a physical address to the data network interface $404_4$. When the virtual machine communicates data to a destination, the data network interface $404_4$ transfers the data to the virtual switch using a Virtual Network Switch Protocol. The virtual switch receives the data and uses a miniport exposed by the emulated data network interface 414 to route the data to the destination via the native miniport driver and the physical switch.

Optionally, the emulation mechanism 214 may enable a Single Root Input/Output Virtualization (SR-IOV) feature and/or a Virtual Machine Queue (VMQ) feature for the virtual switch. With respect to the VMQ feature, the physical switch classifies received packets using the destination media access control (MAC) address and routes the packets to different receive queues according to one example implementation. The connection manager 102 may configure a separate path and assign a different path identifier (e.g., HopIDs) for each virtual data network interface. The physical switch may also support other VMQ networking hardware requirements, such as scatter and gather I/O operations. Each receive queue/transmit queue pair may represent a single virtual switch port and/or may be processed by a dedicated processor. As an alternative, each receive queue/transmit queue pair may represent a specific communication path or grouping of communication paths for a particular virtual data network interface. Multiple packets in the receive queue may be transferred directly to a virtual machine in one function call. For example, the emulation mechanism 214 may transfer the packets directly to the virtual machine's shared memory.

With respect to the SR-IOV feature, the emulated data network interface 414 includes a PCIe device/interface that exposes physical functions and virtual functions through the native miniport driver. The emulation mechanism 214 may partition the emulated data network interface 414 such that the PCIe device is presented to the host operating system or the virtualization manager as multiple separate physical PCIe devices. For example, a four-port SR-IOV network interface controller may be partitioned into four devices in which each is assigned a single port. Each of these devices may, for example, be further partitioned into two-hundred and fifty-six single port NICs (virtual functions) for a theoretical total of 1,024 single NIC ports. In one example implementation, a set of path identifiers associated with a certain destination physical address may be partitioned into groupings such that each grouping may be accessed as a separate PCIe device from different virtual machines or physical machines.

The converged interconnect fabric 406 may provide connection-oriented communication in which each associated endpoint data network interface may use a protocol to establish an end-to-end logical or physical connection before any data may be sent. For example, an example pair of data network interfaces may utilize a PCIe device to create a point-to-point communication channel between two PCIe ports, which allows both data network interfaces to send/receive ordinary PCI-requests (e.g., configuration read/write, I/O read/write, memory read/write) and PCI-interrupts (e.g., INTx, MSI, MSI-X).

In one example implementation, the plurality of data network interfaces 404 use physical addresses (e.g., data link layer address, such as a MAC address) and path identifiers to route data along a communication path that may include one or more interconnects of the converged interconnect fabric 406. For example, two or more interconnects may be a chain together and enable one endpoint data network interface to communicate with another data network interface via one or more intermediary data network interfaces (e.g., hops). When routing data along the communication path, each interconnect transports the data to an intermediary data network interface, which relays the data to a next intermediary data network interface or ultimately the other data network interface.

FIG. 4 illustrates an example communication path between the data network interface 404$_3$ and data network interface 404$_{11}$. It is appreciated that the example communication path may be established for either the data network interface 404$_3$ or the data network interface 404$_4$ in order to communicate data, such as Ethernet frames, to the data network interface 404$_{11}$. As described herein, the interconnect 410 connects the data network interface 404$_3$ with the data network interface 404$_5$. In addition, an example interconnect 416 couples the data network interface 404$_5$ with the data network interface 404$_6$, which connects with the data network interface 404$_9$ through an example interconnect 418. The data network interface 404$_9$ may use an example interconnect 420 to communicate with the data network interface 404$_{11}$. A set of these example interconnects define the example communication path. In one example implementation, the data network interface 404$_3$ may also use one or more of the example interconnects to communicate data to any intermediary data network interface within the example communication path.

Starting from each data network interface at a root node of the plurality of nodes 408, the connection manager 102 enumerates each of the data network interfaces 404 in the example configuration and builds a topology graph. The connection manager 102 may notified of topology changes caused by hot-plug and hot-unplug events. After an initial enumeration, the connection manager 102 configures communication paths to enable data transmission between the plurality of data network interfaces 404.

Figure 5:
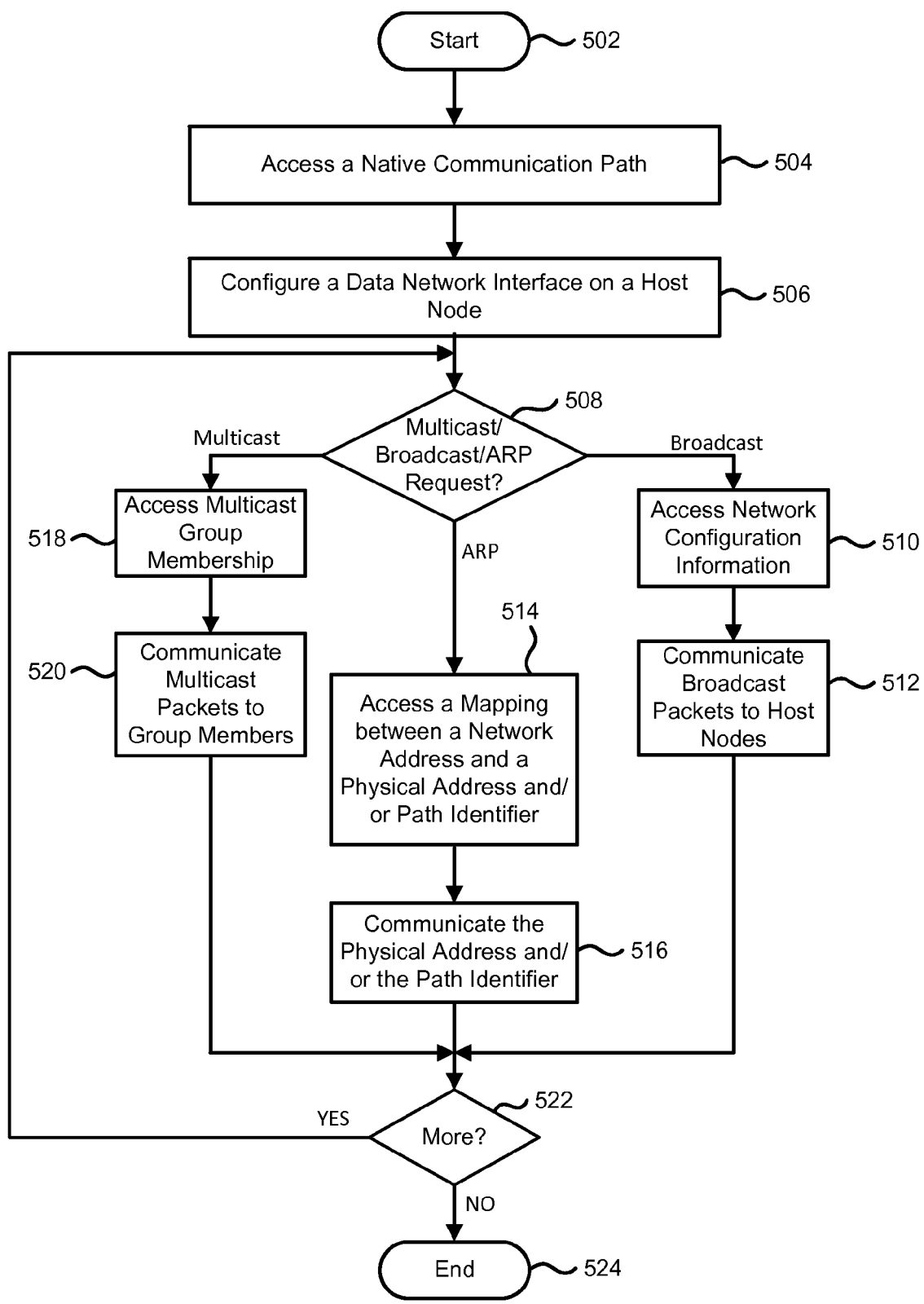
FIG. 5 is a flow diagram illustrating example steps for providing a local area network over a converged interconnect fabric according to one example implementation.

FIG. 5 is a flow diagram illustrating example steps for providing a local area network over a converged interconnect fabric between data network interfaces according to one example implementation. The example steps may commence at step 502 and proceed to step 504 at which the orchestrator 104 accesses a native communication path associated with an interconnect technology. As described herein, the native communication path may be a communication path from a root node to a host node that is compatible with an interconnect controller (e.g., an electrical or optical interconnect controller). In one example implementation, the orchestrator 104 may configure the host node with a network address and a physical address associated with the root node.

Step 506 is directed to configuring a data network interface on the host node. In one example implementation, the orchestrator 104 communicates a physical address to the host node, which stores these addresses in host configuration information. In another example implementation, the orchestrator 104 communicates a message indicating a physical address assignment to each host node, which facilitates a binding process between the kernel mode component 304 and overlaying protocol drivers. If a host node does not acknowledge the receipt of the message, the orchestrator 104 resends the message at a later point in time. Alternatively, the orchestrator 104 may instruct the connection manager 102 to program a serial number register with a lower portion of a MAC address assigned to the host node, which may be combined with a predefined MAC prefix to form a locally unique 48-bit MAC address. As another alternative, the physical address for the host node may be derived from a native, unique identifier provided by the interconnect technology.

Once the orchestrator configures a particular host node with the physical address, the particular host node may request a network address to complete the host configuration process. In one example implementation, the emulation mechanism 214 communicates a DHCP request to which the orchestrator replies with the network address, such as an IP address. The emulation mechanism 214 may store the network address in the host configuration data and proceed to handling ARP requests, providing multicast/broadcast services and/or communicating application data.

Step 508 refers to a determination as to whether one or more current packets include a multicast request, a broadcast request or an ARP request. If the orchestrator 104 received the broadcast request, step 508 proceeds to step 510 at which the orchestrator 104 accesses network configuration information and delineates IP addresses for each host node within a same subnet as a source node of the broadcast request. The orchestrator 104 replies to the broadcast request with an IP address associated with the root node such that subsequent broadcast packets arrive at the root node. Step 512 is directed to communicating a copy of the subsequent broadcast packets to each host node with the subnet. Accordingly, the orchestrator 104 may function as proxy or a gateway for broadcasting the application data to these host nodes.

If the orchestrator 104 received the ARP request, step 508 proceeds to step 514 at which the orchestrator 104 extracts the network address from the ARP request and uses the network configuration information to access a mapping between the network address and a physical address associated with a destination host node. In one example implementation, the orchestrator 104 also identifies a mapping between a communication path identifier and the physical addresses of the destination node and the host node. Step 516 is directed to communicating the physical address of the destination node and the communication path identifier to the host node in response to the ARP request.

If the orchestrator 104 received the multicast request, step 508 proceeds to step 518 at which the orchestrator 104 uses the network configuration information to access a multicast group membership associated with the multicast request and enumerate IP addresses for each host node within the multicast group membership. The orchestrator 104 replies to the multicast request with the IP address associated with the root node such that subsequent multicast packets arrive at the root node. Step 520 is directed to communicating a copy of the subsequent multicast packets to each host node with the subnet. If a particular host node is located outside of the same subnet as the source node, the orchestrator 104 uses a gateway mechanism IP address to route the multicast packets.

Step 522 is directed to determining whether there are more requests from host nodes within the network. If there are more requests, step 522 returns to step 508. If there are no more requests, step 522 proceeds to step 524. Step 524 represents terminating the steps described in FIG. 5.

Figure 6:
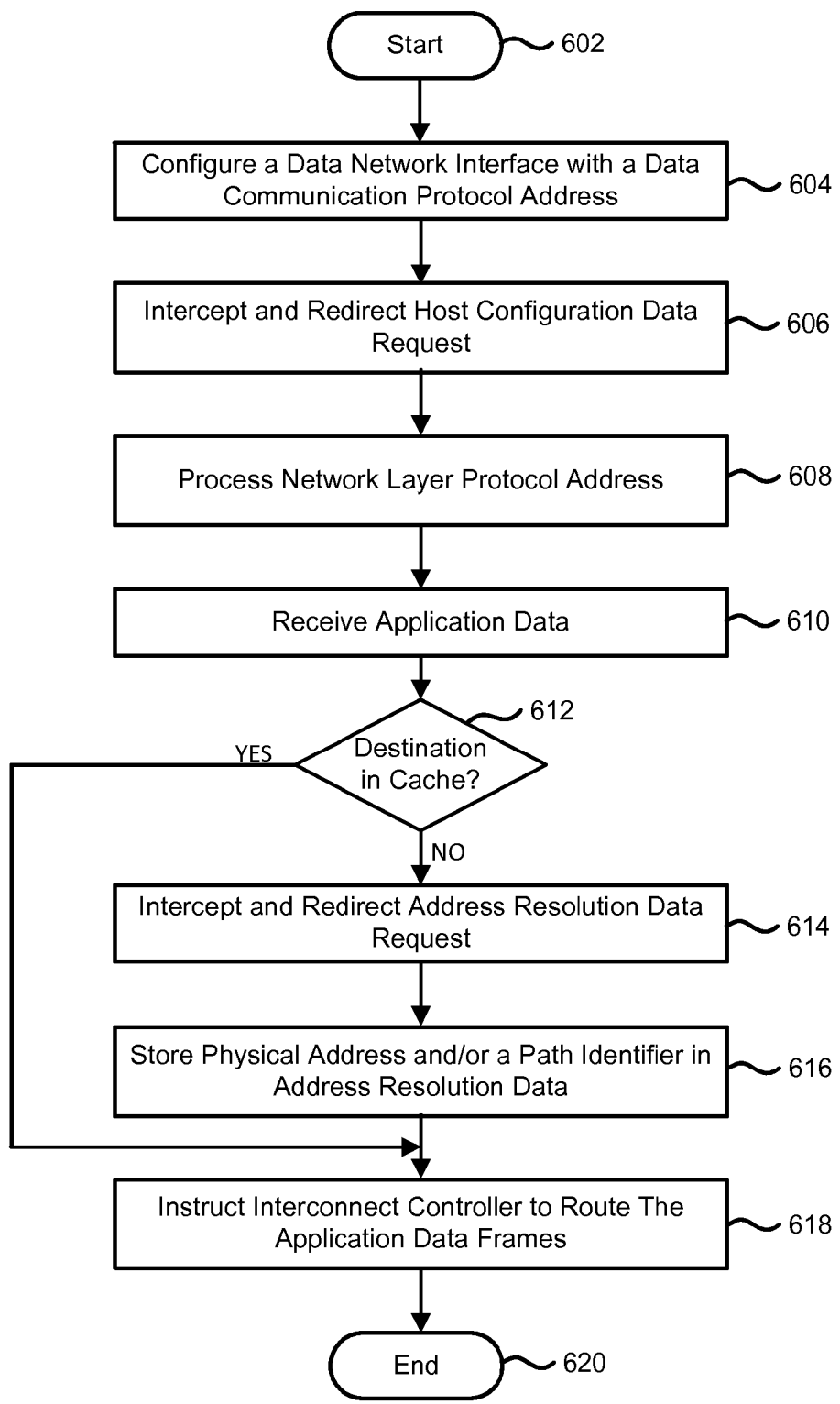
FIG. 6 is a flow diagram illustrating example steps for emulating a data network interface in accordance with a networking standard according to one example implementation.

FIG. 6 is a flow diagram illustrating example steps for emulating a data communication protocol in accordance with a networking standard according to one example implementation. The example steps may commence at step 602 and proceed to step 604 at which the emulation mechanism 214 stores a data communication protocol address in host configuration data. The data communication protocol address may be referred to as a physical or hardware address that is assigned to an attached switch. In one example implementation, the emulation mechanism 214 requests the physical address from the orchestrator 104 running within a root node within a network, such as a local area network over a converged interconnect fabric.

Step 606 is directed to intercepting and redirecting a host configuration data request. In one example implementation, overlaying protocol layer drivers desire a network layer protocol address to communicate application data to another node in a manner that complies with a networking standard, such as Ethernet. The orchestrator 104 may replay with a locally unique network layer protocol address assignment. Step 608 is directed to processing the network layer protocol address (i.e., a network address), which is stored in the host configuration data.

Step 610 represents receiving the application data to be communicated to a destination node. Step 612 determines whether a physical address that resolves to the network layer protocol address for the destination node is stored in a cache (e.g., an ARP cache). If the physical address is not stored in the cache, step 612 proceeds to step 614. Step 614 is directed to intercepting and redirecting an address resolution data request to the orchestrator 104. Step 616 is directed to storing the physical address and/or a path identifier in the address resolution data. The path identifier may refer to one or more intermediary data network interfaces along a communication path to the destination node. If the physical address is not stored in the cache, step 612 proceeds to step 618. Step 618 refers to instructing an interconnect controller to route application data frames (e.g., Ethernet frames) to the destination node via the communication path. Step 620 refers to a termination of the steps described in FIG. 6.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
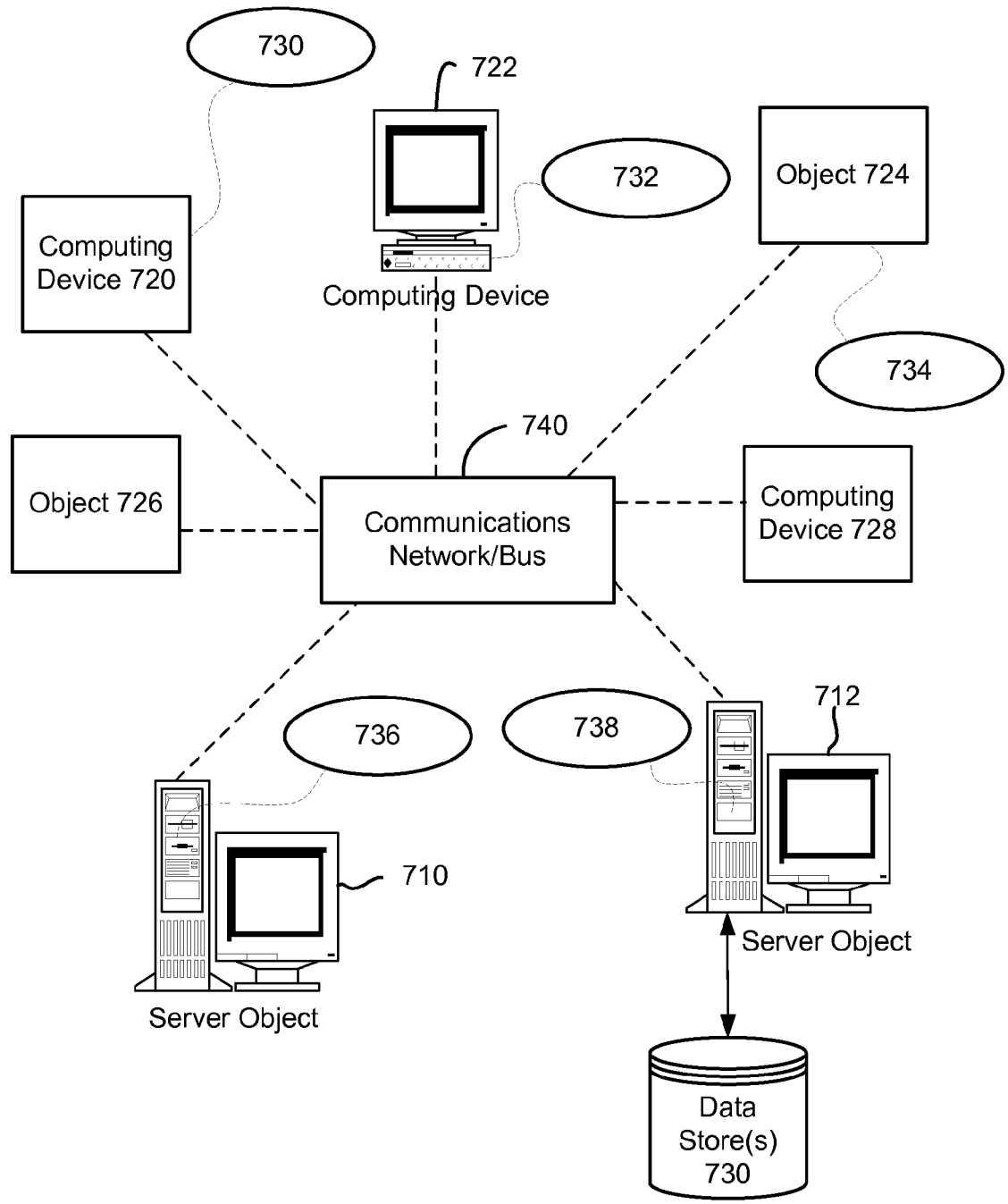
FIG. 7 is a block diagram representing example non-limiting networked environments in which various embodiments described herein can be implemented.

FIG. 7 provides a schematic diagram of an example networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
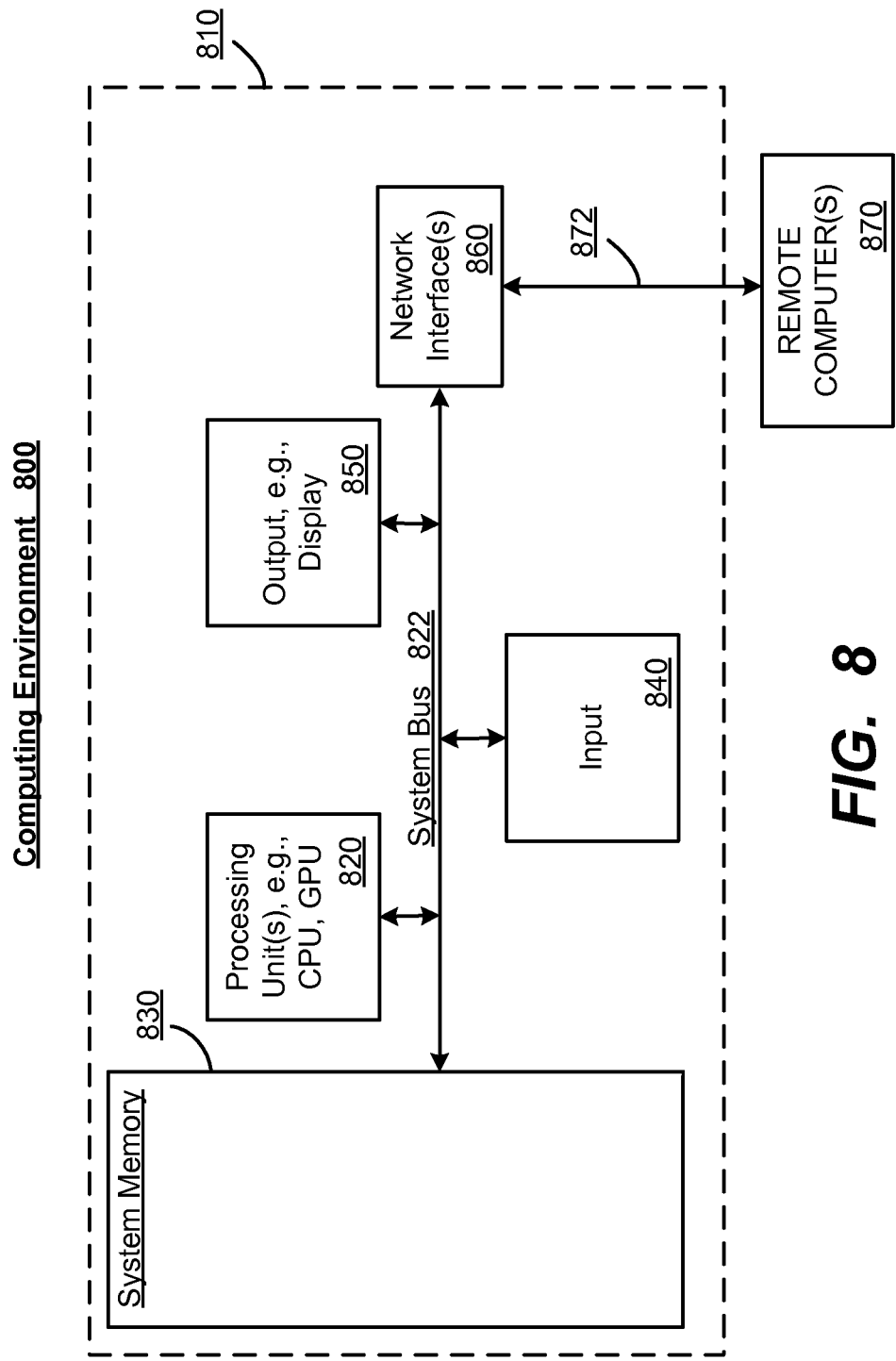
FIG. 8 is a block diagram representing an example non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the example computing system environment 800.

With reference to FIG. 8, an example remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
   emulating a data network interface in accordance with a native networking standard, the data network interface operating with an interconnect controller, including, providing address resolution data to identify a communication path that is compatible with the interconnect controller and associated with a destination for application data within a converged interconnect fabric, the converged interconnect fabric comprising one or more optical interconnects;
   providing an intermediate driver implementing a data communication protocol for a native miniport driver associated with networking hardware components, the intermediate driver providing a miniport to overlaying protocol drivers in a protocol stack; and
   using the interconnect controller to route the application data through the converged interconnect fabric to the destination based on the address resolution data, wherein the application data conforms to the native networking standard, the native networking standard being a different networking standard than a networking standard associated with the converged interconnect fabric.

2. The method of claim 1, wherein providing the address resolution data further comprises intercepting requests for the address resolution data associated with the destination.

3. The method of claim 2, wherein intercepting the requests further comprises redirecting the requests to a root node via the interconnect controller.

4. The method of claim 3, further comprising:
   storing a path identifier representing the communication path and a physical address associated with the destination in the address resolution data.

5. The method of claim 4, further comprising:
   instructing the interconnect controller to communicate the application data to the destination via one or more interconnects.

6. The method of claim 1, wherein providing the address resolution data further comprises processing a native communication path from the interconnect controller to a root node, and processing host configuration data that is communicated via the native communication path and comprises at least one of a network address or a physical address associated with a switch.

7. The method of claim 1, wherein providing the address resolution data further comprises storing a mapping between a network address and a physical address in the address resolution data, wherein the mapping is associated with a data network interface of the destination.

8. The method of claim 1, wherein using the interconnect controller to route the application data further comprises communicating multicast packets that comprises the application data to a root node that routes a copy of the multicast packets to one or more members of a multicast membership group.

9. The method of claim 1, wherein using the interconnect controller to route the application data further comprises communicating broadcast packets that comprises the application data to a root node, wherein the root node routes a copy of the broadcast packets to a host node within a subnet.

10. The method of claim 1, further comprising:
a kernel mode component configured to intercept requests for address resolution data associated with the destination; and
a user mode component configured to redirect the requests to a root node via the interconnect controller.

11. In a computing environment, a system, comprising:
an orchestrator configured to enable a local area network over a converged interconnect fabric between data network interfaces, the converged interconnect fabric comprising one or more optical interconnects, wherein the orchestrator is further configured to access network configuration information comprising a physical address for one or more data network interfaces that is compatible with an associated interconnect controller, to use the network configuration information to create a mapping between a pair of physical addresses and a path identifier associated with an accessible communication path from a corresponding data network interface, and to communicate the mapping to a corresponding node within the local area network via the converged interconnect fabric;
an intermediate driver configured to implement a data communication protocol for a native miniport driver, the intermediate driver providing a miniport to overlaying protocol drivers in a protocol stack; and
the interconnect controller configured to route application data along the accessible communication path to a destination, the application data conforming to a native networking standard, the native networking standard being a different networking standard than a networking standard associated with the converged interconnect fabric.

12. The system of claim 11, wherein the orchestrator is further configured to respond to an address resolution data request with an address associated with a layer of the protocol stack.

13. The system of claim 11, wherein the orchestrator is further configured to respond to a multicast request with an orchestrator physical address and route a copy of multicast packets to a corresponding network address for one or more multicast group members.

14. The system of claim 11, wherein the orchestrator is further configured to respond to a broadcast request with an orchestrator physical address and route a copy of application data to a corresponding network address for a node within a subnet.

15. The system of claim 11, wherein the orchestrator is further configured to assign the physical addresses to the data network interfaces within the local area network within a data center.

16. The system of claim 11, wherein the system further comprises an emulation mechanism configured to implement a data communication protocol that routes application data to a destination in accordance with a networking standard, wherein the emulation mechanism comprises the intermediate driver with an optical interconnect controller for communicating the application data via a plurality of optical interconnects in the converged interconnect fabric, wherein a kernel mode component and a user mode component cooperate to provide the intermediate driver implementing the data communication protocol for a native miniport driver.

17. The system of claim 16, wherein the emulation mechanism is further configured to partition an emulated data network interface into virtual data network interfaces, and wherein the orchestrator is further configured to assign a network address and a physical address to a virtual network interface.

18. One or more computer-readable devices having computer-executable instructions, which when executed perform steps, comprising:
accessing a native communication path with an orchestrator for a local area network, wherein the native communication path comprises one or more interconnects;
configuring a node with a physical address that is communicated by the orchestrator via the native communication path;
providing a data communication protocol to a native miniport driver for controlling a switch within the node, the switch corresponds to an interconnect technology, an intermediate driver implementing the data communication protocol for the native miniport driver;
providing a miniport to overlaying protocol layer drivers in accordance with a native networking standard;
requesting a network address for the node from the orchestrator via the native communication path;
requesting a destination physical address for a data network interface from the orchestrator via the native communication path; and
routing application data frames through a converged interconnect fabric to the destination physical address, by a protocol-independent interconnect controller, using the miniport driver to the data network interface, wherein the application data frames conform to the native networking standard, the native networking standard being a different networking standard than a networking standard associated with the one or more interconnects.

19. The one or more computer-readable devices of claim 18 having further computer-executable instructions comprising:
providing the intermediate driver implementing the data communication protocol for the native miniport driver by a kernel mode component and a user mode component; and
partitioning the switch into one or more virtual data network interfaces for one or more virtual machines.

20. The one or more computer-readable devices of claim 18 having further computer-executable instructions comprising:
instructing the protocol-independent interconnect controller to communicate the application data frames along a communication path to the data network interface.

* * * * *